(12) United States Patent
Murata et al.

(10) Patent No.: US 12,480,486 B2
(45) Date of Patent: Nov. 25, 2025

(54) PRESSURE SWITCH WITH TWO PRESSING MEMBERS AND A HERMETIC ELECTRIC COMPRESSOR ARRANGEMENT THEREWITH

(71) Applicant: UBUKATA INDUSTRIES CO., LTD., Nagoya (JP)

(72) Inventors: Hiroshi Murata, Nagoya (JP); Hideki Okumura, Nagoya (JP); Takehiko Okumura, Nagoya (JP)

(73) Assignee: UBUKATA INDUSTRIES CO., LTD., Nagoya (JP)

( * ) Notice: Subject to any disclaimer, the term of this patent is extended or adjusted under 35 U.S.C. 154(b) by 74 days.

(21) Appl. No.: 18/572,925

(22) PCT Filed: Mar. 25, 2022

(86) PCT No.: PCT/JP2022/014479
§ 371 (c)(1),
(2) Date: Dec. 21, 2023

(87) PCT Pub. No.: WO2023/276355
PCT Pub. Date: Jan. 5, 2023

(65) Prior Publication Data
US 2024/0297003 A1    Sep. 5, 2024

(30) Foreign Application Priority Data
Jun. 30, 2021    (JP) ................ 2021-108880

(51) Int. Cl.
*H01H 35/26*    (2006.01)
*F04B 39/02*    (2006.01)
(Continued)

(52) U.S. Cl.
CPC ....... *F04B 49/022* (2013.01); *H01H 35/2657* (2013.01); *H01H 35/34* (2013.01); *F04B 39/023* (2013.01)

(58) Field of Classification Search
CPC ............ H01H 35/245; H01H 35/2657; H01H 35/343; H01H 35/34; F04B 39/00; F04B 49/022; F04B 39/023
See application file for complete search history.

(56) References Cited

U.S. PATENT DOCUMENTS

| 1,684,530 A * | 9/1928 | Bast ................ H01H 35/34 236/99 A |
| 5,998,051 A * | 12/1999 | Poirier ............ H01M 50/574 429/58 |

(Continued)

FOREIGN PATENT DOCUMENTS

| DE | 3616696 A1 | 11/1987 |
| DE | 102004041403 B | 11/2005 |

(Continued)

OTHER PUBLICATIONS

International Search Report dated Jun. 14, 2022, for International Patent Application No. PCT/JP2022/014479.

(Continued)

*Primary Examiner* — Nathan C Zollinger
(74) *Attorney, Agent, or Firm* — KARCESKI IP LAW, PLLC

(57) ABSTRACT

A pressure switch includes a pressure-resistant container, a contact mechanism, at least one airtight terminal, a diaphragm that is operated at first operating pressure and is restorable at restoring pressure lower than first operating pressure, a first pressing member that presses the contact mechanism due to the operation of the diaphragm and switches the contact mechanism to an open state, a pressure-receiving deformation member that is deformed and operated at second operating pressure higher than the first operating pressure, and is not restored even when the pressure decreases to atmospheric pressure after the operation at the second operating pressure, and a second pressing member that presses the contact mechanism due to the operation of the pressure-receiving deformation member and switches the contact mechanism to the open state. The first pressing member and the second pressing member are composed of an inorganic material without containing any organic material.

7 Claims, 10 Drawing Sheets

(51) Int. Cl.
*F04B 49/02* (2006.01)
*H01H 35/34* (2006.01)

(56) References Cited

U.S. PATENT DOCUMENTS

2019/0362919 A1* 11/2019 Murata ................ F25B 49/025
2020/0243287 A1* 7/2020 Miyakawa ........... H01H 35/343

FOREIGN PATENT DOCUMENTS

| | | |
|---|---|---|
| JP | 2000057916 A | 2/2000 |
| JP | 2002260505 A | 9/2002 |
| JP | 2005209438 A | 8/2005 |
| WO | WO-2018150458 A1 * | 8/2018 ............ F25B 49/025 |

OTHER PUBLICATIONS

Japanese Office Action dated Jun. 14, 2023, for Japanese Patent Application No. 2021-108880.
Taiwanese Office Action dated Mar. 29, 2023, for Taiwanese Patent Application No. 111111583.
Extended European Search Report dated May 8, 2025, for European Patent Application No. 22832516.3.
Korean Office Action dated Apr. 18, 2025, for Korean Patent Application No. 10-2023-7039648.

* cited by examiner

PRESSURE SWITCH WITH TWO PRESSING MEMBERS AND A HERMETIC ELECTRIC COMPRESSOR ARRANGEMENT THEREWITH

CROSS-REFERENCE TO RELATED APPLICATION(S)

This is a National Stage Entry into the United States Patent and Trademark Office from International Patent Application No. PCT/JP2022/014479, filed on Mar. 25, 2022, which relies on and claims priority to Japanese Patent Application No. 2021-108880, filed on Jun. 30, 2021, the entire contents of both of which are incorporated herein by reference.

FIELD OF THE INVENTION

Embodiments of the present invention relate to a pressure switch, and a hermetic electric compressor.

BACKGROUND OF THE INVENTION

Conventionally, for example, some hermetic electric compressors used in refrigerating cycles include pressure switches as protection devices. The pressure switch is housed together with a motor and the like inside a hermetic container that forms an outer shell of the hermetic electric compressor. When the pressure inside the hermetic container rises and becomes abnormal, power supply to the motor is cut off and the operation of the compressor is stopped.

Here, in a case where the pressure abnormality is caused due to a temporary overload during the refrigerating cycle, it is considered that there is no damage to equipment inside the hermetic container or the hermetic container itself. Even in such a case, if repair or replacement of the pressure switch is required every time the pressure switch is operated, it would take time and effort. Therefore, in a case where the pressure abnormality is caused by the temporary overload during the refrigerating cycle, it is preferable that the pressure switch is operated to cut off the power supply to the motor, and thereafter the pressure switch is able to be restored and the hermetic electric compressor is able to be restarted.

On the other hand, in the hermetic electric compressors, for example, a design upper limit which does not cause mechanical damage is set in order to allow the temporary overload during the refrigerating cycle. However, in a case where the pressure abnormality exceeds a range of the temporary overload of the refrigerating cycle, that is, exceeds the design upper limit, the equipment inside the hermetic container or the hermetic container itself may be damaged. In this case, when the pressure switch is restored, and the hermetic electric compressor is restarted, there is a risk of causing further damage to the internal equipment or the like. Therefore, in a case where the pressure abnormality exceeds the range of the temporary overload of the refrigerating cycle, it is preferable that the pressure switch is operated to cut off the power supply to the motor, and thereafter the hermetic electric compressor cannot be restarted by preventing the pressure switch from restoring.

From the above circumstance, it is preferable that the hermetic electric compressor is provided with both a pressure switch that can be restored after operation and a pressure switch that cannot be restored after operation. On the other hand, in recent years, a demand for downsizing of a compressor, or the like becomes high, and equipment, wires, and the like are stored in a hermetic container at a high density. Therefore, it is difficult to secure a mounting space when both the pressure switch that can be restored after operation and the pressure switch that cannot be restored after operation are tried to be provided in the hermetic container. Therefore, there is proposed a pressure switch that has both functions of the pressure switch that can be restored after operation and the pressure switch that cannot be restored after operation.

However, in order to put a pressure switch that can be installed inside a hermetic container of a hermetic electric compressor, that is, inside a compressor container, into practical use, it is necessary to further improve durability against the temperature and the pressure inside the compressor container to ensure long-term reliability.

SUMMARY OF THE INVENTION

Therefore, a pressure switch that is compact and has long-term reliability, and a hermetic electric compressor using the pressure switch are provided.

A pressure switch includes: a pressure-resistant container made of metal and having airtightness; a contact mechanism that is made of metal, is provided inside the pressure-resistant container, is normally in a closed state, and is brought into an open state when pressing force is applied; at least one airtight terminal that is made of metal, is provided through the pressure-resistant container, and is connected to the contact mechanism; a diaphragm that is made of metal, is provided airtightly on a first end surface part as an end surface part of the pressure-resistant container, is operated at first operating pressure, and is restorable at restoring pressure lower than the first operating pressure; a first pressing member that is provided through the first end surface part, and presses the contact mechanism due to the operation of the diaphragm and switches the contact mechanism to the open state; a pressure-receiving deformation member that is made of metal, is airtightly provided on a second end surface part different from the first end surface part of end surface parts of the pressure-resistant container, is deformed and operated at second operating pressure higher than the first operating pressure, and is not restored even when the pressure decreases to atmospheric pressure after the operation at the second operating pressure; and a second pressing member that is provided through the second end surface part, and presses the contact mechanism due to the operation of the pressure-receiving deformation member and switches the contact mechanism to the open state. The first pressing member and the second pressing member are composed of an inorganic material without containing any organic material.

A hermetic electric compressor includes: a compressor container having airtightness; a compressor mechanism that is provided inside the compressor container, and compresses and discharges a refrigerant; a motor that is provided inside the compressor container, and drives the compressor mechanism; and the aforementioned pressure switch provided inside the compressor container and connected to a power line of the motor.

DESCRIPTION OF EMBODIMENT(S) OF THE INVENTION

Hereinafter, an embodiment will be described with reference to the drawings.

Figure 1:
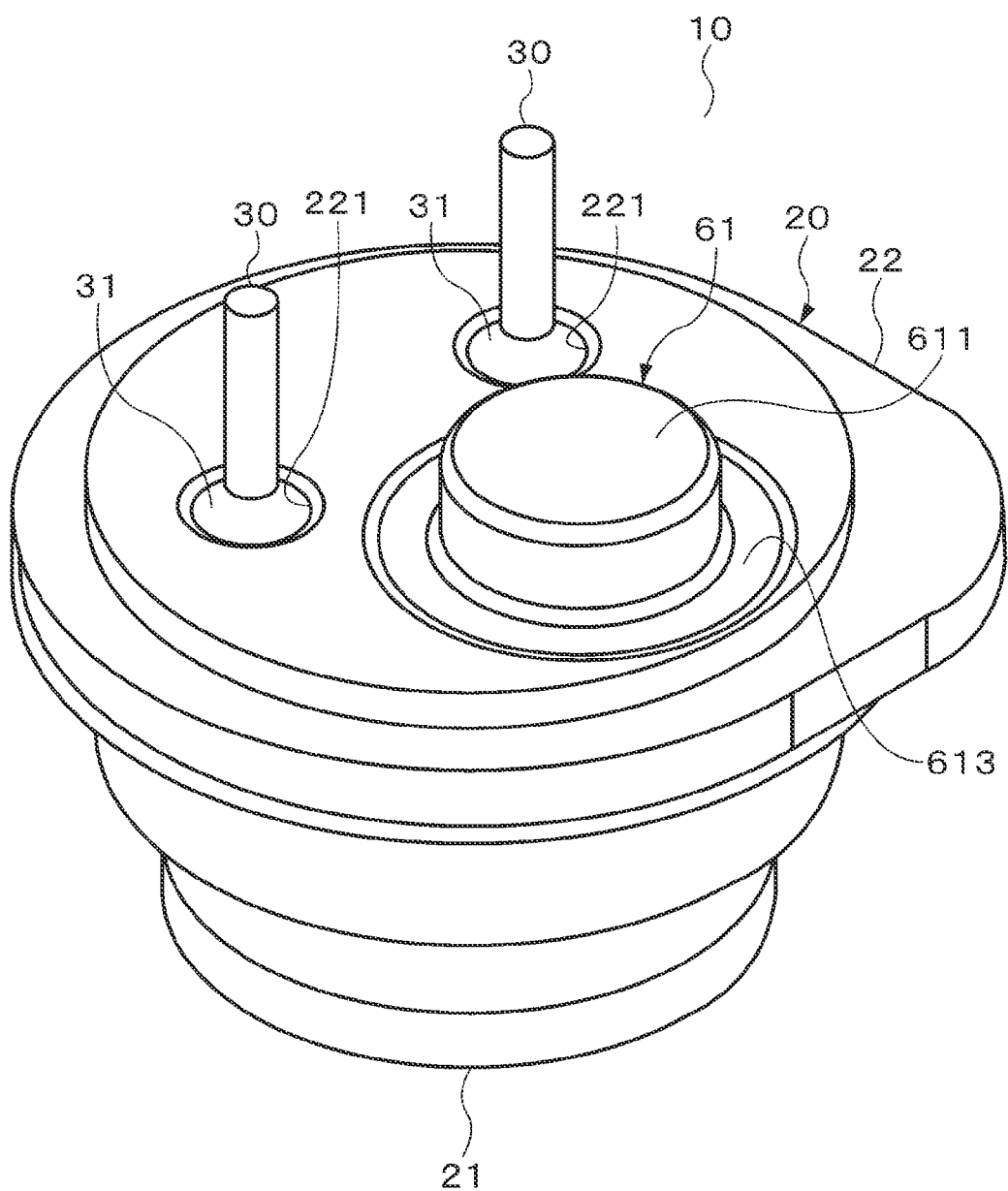
FIG. 1 is a perspective view illustrating an external configuration of an example of a pressure switch according to an embodiment.
Figure 2:
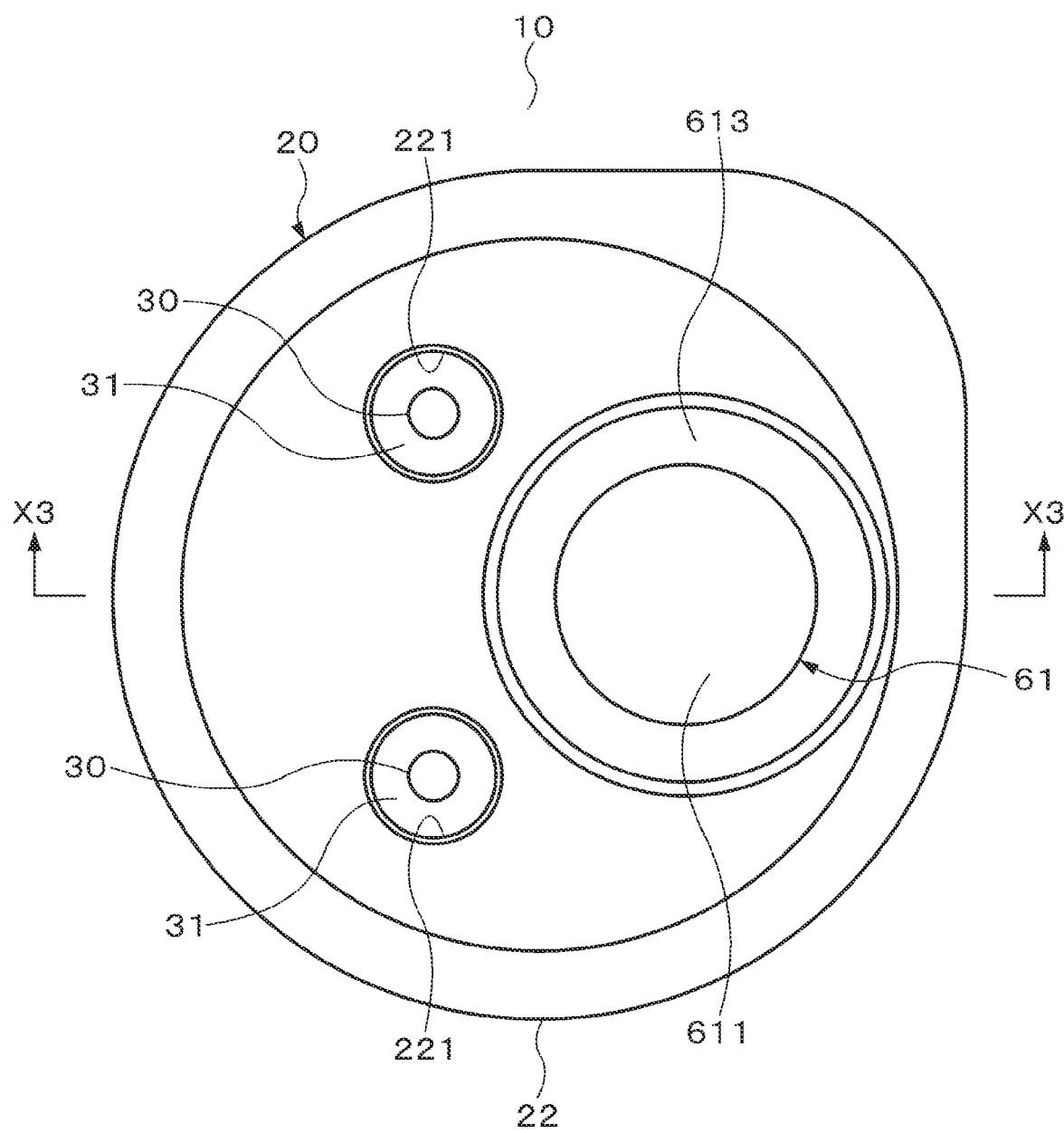
FIG. 2 is a plan view illustrating the external configuration of the example of the pressure switch according to the embodiment.
Figure 3:
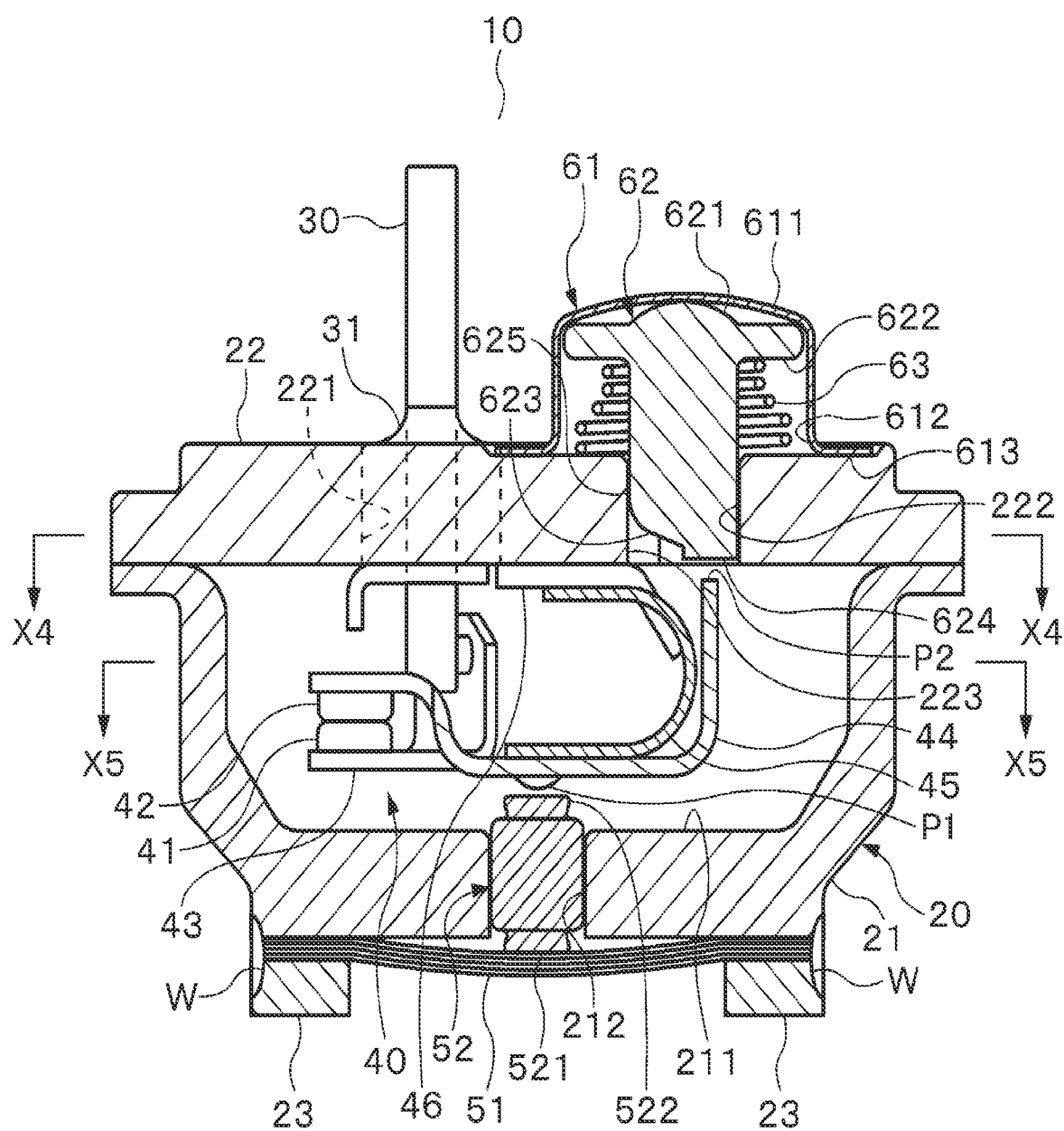
FIG. 3 is a sectional view taken along a line X3-X3 of FIG. 2, which schematically illustrates an internal configuration of the example of the pressure switch according to the embodiment.

A pressure switch 10 of this embodiment is a pressure responsive switch that has a pair of contacts which are normally in a closed state, and brings the contacts into an open state in response to two different pressures. As illustrated in FIG. 1 to FIG. 3, the pressure switch 10 includes a pressure-resistant container 20. The pressure-resistant container 20 is a metal container that is pressure resistant, airtight, and electrically conductive, and forms an outer shell of the pressure switch 10.

As illustrated in FIG. 3, the pressure-resistant container 20 includes a container body 21 and a cover plate 22. The container body 21 is formed into a substantially cylindrical or bowl-shaped container shape with a first end surface part 211 serving as a bottom of the container body 21 on one side and an open end on the other side by, for example, drawing. In the case of this embodiment, the container body 21 is formed into a substantially cylindrical container shape whose inner diameter increases from the first end surface part 211 toward the opening side. In this case, the thickness dimension of the first end surface part 211 is larger than the thickness dimension of a side surface part provided around the first end surface part 211

The cover plate 22 is, for example, a metal plate, in this case, a disc, and is welded and fixed to the entire circumference of the opening side of the container body 21. Consequently, the cover plate 22 airtightly closes the opening of the container body 21. The cover plate 22 forms a second end surface part 22 of the pressure-resistant container 20. In the following description, the cover plate 22 is sometimes referred to as the second end surface part 22. The thickness dimension of the second end surface part 22 is substantially the same as the thickness dimension of the first end surface part 211, and is larger than the thickness dimension of the side surface part provided around the first end surface part 211.

The container body 21 may not have the first end surface part 211. That is, in this case, the container body can be configured in a cylindrical shape with both one end surface and the other end surface being open. Respective cover plates are welded and fixed to openings on both sides of the container body. Consequently, the pressure-resistant container is formed such that the openings on the both sides of the container body are airtightly closed by the cover plates.

The pressure switch 10 includes at least one airtight terminal 30. In the case of this embodiment, the pressure switch 10 includes two airtight terminals 30 as illustrated in FIG. 1 and FIG. 2. The airtight terminals 30 can be made of, for example, an electrically conductive metal and is composed of a cylindrical rod-shaped member. The airtight terminals 30 are provided through, for example, the second end surface part 22 of the pressure-resistant container 20. In the case of this embodiment, each airtight terminal 30 is provided at a position deviated from the center of the second end surface part 22 as illustrated in FIG. 3, and passes through a terminal hole 221 formed in the second end surface part 22. That is, in the case of this embodiment, the airtight terminals 30 are provided on the other end surface part of the pressure-resistant container 20. Around the airtight terminals 30, that is, inside the terminal holes 221, electrically insulating filler 31 such as glass are provided. Consequently, the airtight terminals 30 are fixed to the second end surface part 22, that is, the pressure-resistant container 20 in an airtightly and electrically insulated state.

As illustrated in FIG. 3, the pressure switch 10 includes a contact mechanism 40. The contact mechanism 40 is provided inside the pressure-resistant container 20. The contact mechanism 40 includes fixed contacts 41 and movable contacts 42. The contact mechanism 40 is a mechanism that separates and contacts, that is, opens and closes the fixed contacts 41 and the movable contacts 42. In the case of this embodiment, the pressure switch 10 includes the two fixed contacts 41 and the two movable contacts 42 corresponding to the two airtight terminals 30.

The contact mechanism 40 is entirely composed of inorganic materials such as metal, and does not contain any organic material such as resin. The contact mechanism 40 can be configured to further have fixed members 43, a movable member 44, and an elastic member 45, for example. The fixed members 43, the movable member 44, and the elastic member 45 can be all composed of, for example, metal materials. In the case of this embodiment, the number of the fixed members 43 corresponds to the number of the airtight terminals 30 and the number of the fixed contacts 41. That is, in the case of this embodiment, the pressure switch 10 includes the two fixed members 43 corresponding to the two airtight terminals 30 and the two fixed contacts 41.

Figure 5:
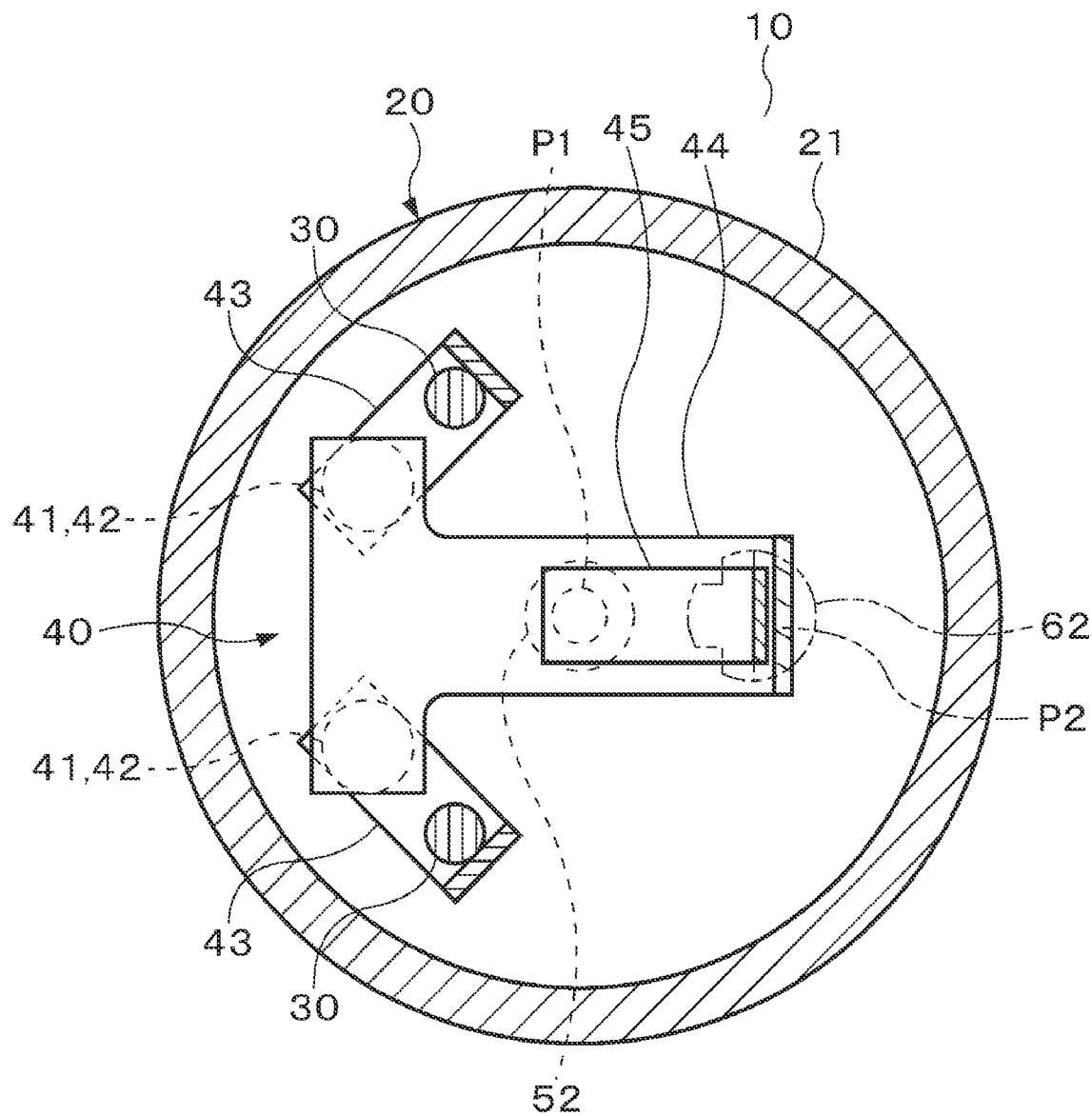
FIG. 5 is a sectional view taken along a line X5-X5 of FIG. 3, which schematically illustrates the internal configuration of the example of the pressure switch according to the embodiment.

The fixed members 43 can be formed, for example, by bending an electrically conductive metal plate. As illustrated in FIG. 3 and FIG. 5, each fixed member 43 extends from the airtight terminal 30 toward the center of the pressure-resistant container 20. An end of each airtight terminal 30, which is inside the pressure-resistant container 20, is fixed to an end of the fixed member 43 by welding or the like. Consequently, the airtight terminals 30 and the fixed members 43 are electrically and physically connected. That is, the airtight terminals 30 are electrically and physically connected to the contact mechanism 40 by the welding to the fixed members 43.

The fixed contacts 41 are formed into a hemispherical shape by an electrically conductive material such as metal. The fixed contacts 41 are fixed to the other end of fixed member 43 by welding or the like. Consequently, the fixed contacts 41 and the fixed members 43 are electrically and physically connected. That is, the fixed contacts 41 are electrically connected to the airtight terminals 30 via the fixed members 43.

The movable member 44 and the elastic member 45 are formed so as to cause the movable contacts 42 to be separated from and come into contact with the fixed contacts 41. In the case of this embodiment, the contact mechanism 40 includes one movable member 44. This one movable member 44 has a function of causing the two movable contacts 42 to simultaneously separate from and come into contact with the two fixed contacts 41.

The movable member 44 can move the movable contacts 42 in such a direction as to bring the movable contacts 42 into contact with the fixed contacts 41 and in such a direction as to separate the movable contacts 42 from the fixed contacts 41. As illustrated in FIG. 3, FIG. 5, and other figures, the movable member 44 can be configured, for example, by bending an electrically conductive metal plate. As illustrated in FIG. 5, for example, the movable member 44 can be configured by bending a substantially T-shaped or substantially Y-shaped plate-like member that branches into two in plan view.

The movable contacts 42 are formed into a hemispherical shape by an electrically conductive material such as metal, like the fixed contacts 41. The two movable contacts 42 are provided at such positions as to face the fixed contacts 41 on the movable member 44. That is, the two movable contacts 42 are fixed to a surface on the first end surface part 211 side at both ends of a branched part of the movable member 44 by welding or the like. Consequently, the two movable contacts 42 face the respective corresponding fixed contacts 41. In this case, as illustrated in FIG. 3 and other figures, the movable member 44 is bent in a shallow U-shape in which a part on the side opposite to the movable contacts 42 in the direction parallel to the first end surface part 211 and the second end surface part 22 protrudes toward the first end surface part 211, and the movable member 44 is further continuous from the shallow U-shape and is bent at an approximately right angle toward the second end surface part 22, when viewed from the side.

The elastic member 45 illustrated in FIG. 3 and other figures is composed of an elastic and electrically conductive member. One end of the elastic member 45 is fixed directly or indirectly near the center of the pressure-resistant container 20, in this case, the second end surface part 22. For example, the one end of the elastic member 45 can be connected indirectly to the pressure-resistant container 20 via an adjustment member 46. In this case, the adjustment member 46 is composed of an electrically conductive member composed of an inorganic material such as metal, and has a function of adjusting the contact state between the fixed contacts 41 and the movable contacts 42, for example. In addition, the other end of the elastic member 45 is fixed near the center of the movable member 44. Consequently, the movable contacts 42 are electrically connected to the second end surface part 22 of pressure-resistant container 20 via the movable member 44 and the elastic member 45. In this configuration, the elastic member 45 applies elastic force to the movable member 44 such that the fixed contacts 41 and the movable contacts 42 are in a closed state, and supports the movable member 44 so as to be movable in the direction in which the movable contacts 42 separates from the fixed contacts 41 and in the direction in which the movable contacts 42 approaches the fixed contacts 41.

The elastic member 45 can be composed of, for example, a plate spring made by bending an electrically conductive metal plate into a U-shape. The elastic member 45 includes U-shaped one end fixed to the second end surface part 22 of the pressure-resistant container 20 by welding or the like, and the other end fixed to the central part of the movable member 44 by welding or the like. Consequently, the elastic member 45 electrically connects the movable contacts 42 to the pressure-resistant container 20 through the movable member 44 and the elastic member 45, and supports the movable member 44 in a swingable manner.

In the above configuration, the movable member 44 and the elastic member 45 are configured separately and are connected to each other by welding or the like. However, the present invention is not limited to this configuration. For example, the movable member 44 and the elastic member 45 may be integrally formed by stamping or the like. In addition, the elastic member 45 is not limited to the U-shaped plate spring, but may also be a coil spring, for example. In this case, the elastic member 45, which is composed of the coil spring, supports the movable member 44 such that the movable member 44 can not only swing but also move in parallel between the first end surface part 211 and the second end surface part 22.

The movable member 44 includes a first pressing point P1 and a second pressing point P2, as illustrated in FIG. 3. The first pressing point P1 is provided on the first end surface part 211 side of the movable member 44. On the other hand, the second pressing point P2 is provided on the second end surface part 22 side of the movable member 44. In this case, as illustrated in FIG. 3 and FIG. 5, a distance from each movable contact 42 to first pressing point P1 is different from a distance from each movable contact 42 to the second pressing point P2, in plan view. The distance from the movable contact 42 to the second pressing point P2 is longer than the distance from the movable contact 42 to first pressing point P1. That is, when viewed in the horizontal direction of paper in FIG. 5, the first pressing point P1 is located between the movable contacts 42 and the second pressing point P2 in the movable member 44.

As illustrated in FIG. 3 and FIG. 5, the first pressing point P1 can be set, for example, near the center in the longitudinal direction of the movable member 44, on a surface on the first end surface part 211 side in the movable member 44. The second pressing point P2 can be set, for example, on an end opposite to the movable contacts 42 in the movable member 44. In this case, the movable member 44 can be configured by bending, for example, at a substantially right angle between the first pressing point P1 and the second pressing point P2, and an end surface extending in the thickness direction of the movable member 44 can be set to the second pressing point P2.

In this configuration, the elastic force of the elastic member 45 is applied to the movable member 44 such that the fixed contacts 41 and the movable contacts 42 are in a closed state. Therefore, the contact mechanism 40 is in a closed state with the fixed contacts 41 and the movable contacts 42 in contact during the normal operation when the pressing force is not applied to the first pressing point P1 and the second pressing point P2 of the movable member 44. On the other hand, when pressing force is applied to the first pressing point P1 or the second pressing point P2 of the movable member 44, the movable member 44 moves in parallel or swings, and the movable contacts 42 separate from the fixed contacts 41. Therefore, when pressing force is applied to the first pressing point P1 or the second pressing point P2 of the movable member 44, the contact mechanism 40 is brought into an open state in which the electrical connection between the fixed contacts 41 and the movable contacts 42 is disconnected.

The pressure switch 10 further includes a diaphragm 51, a first pressing member 52, a pressure-receiving deformation member 61, a second pressing member 62, and a regulating member 63. The diaphragm 51, the first pressing member 52, the pressure-receiving deformation member 61, the second pressing member 62, and the regulating member 63 are all composed of inorganic materials such as metal and ceramic, and do not contain organic materials such as resin.

The diaphragm 51 is operated with first operating pressure that is greater than the atmospheric pressure, and has a function of causing the first pressing member 52 to move toward the inside of the pressure-resistant container 20 due to this operation, and causing the first pressing member 52 to press the first pressing point P1 to open the contact mechanism 40 in a reversible, that is, restorable manner. The diaphragm 51 can be composed of, for example, a metal plate having a plate-shape by drawing. The diaphragm 51 is provided on the one end surface part of the pressure-resistant container 20, in this case, on an outer surface of the first end surface part 211. The diaphragm 51 is airtightly fixed to the pressure-resistant container 20, for example by welding. In this case, the center of the diaphragm 51 and the center of the first end surface part 211 substantially coincide.

The diaphragm 51 can be configured by laminating a plurality of thin plates, for example. In this case, the pressure-resistant container 20 further includes a holding member 23. The holding member 23 can be composed of an annular plate material made of metal, for example. In this case, the outer diameter of the holding member 23, the outer diameter of the diaphragm 51, and the outer diameter of the first end surface part 211 are equal. In addition, the thickness dimension of the holding member 23 is larger than the thickness dimension of the laminated diaphragm 51.

The diaphragm 51 configured by laminating the plurality of thin plates is installed between the first end surface part 211 of container body 21 and the holding member 23. Then, outer peripheral parts of the diaphragm 51, the first end surface part 211, and the holding member 23 are welded together, so that the diaphragm 51 is airtightly fixed to the first end surface part 211. In this case, a welding mark W by welding is formed on outer peripheral surfaces of the first end surface part 211, the diaphragm 51, and the holding member 23.

Figure 6:
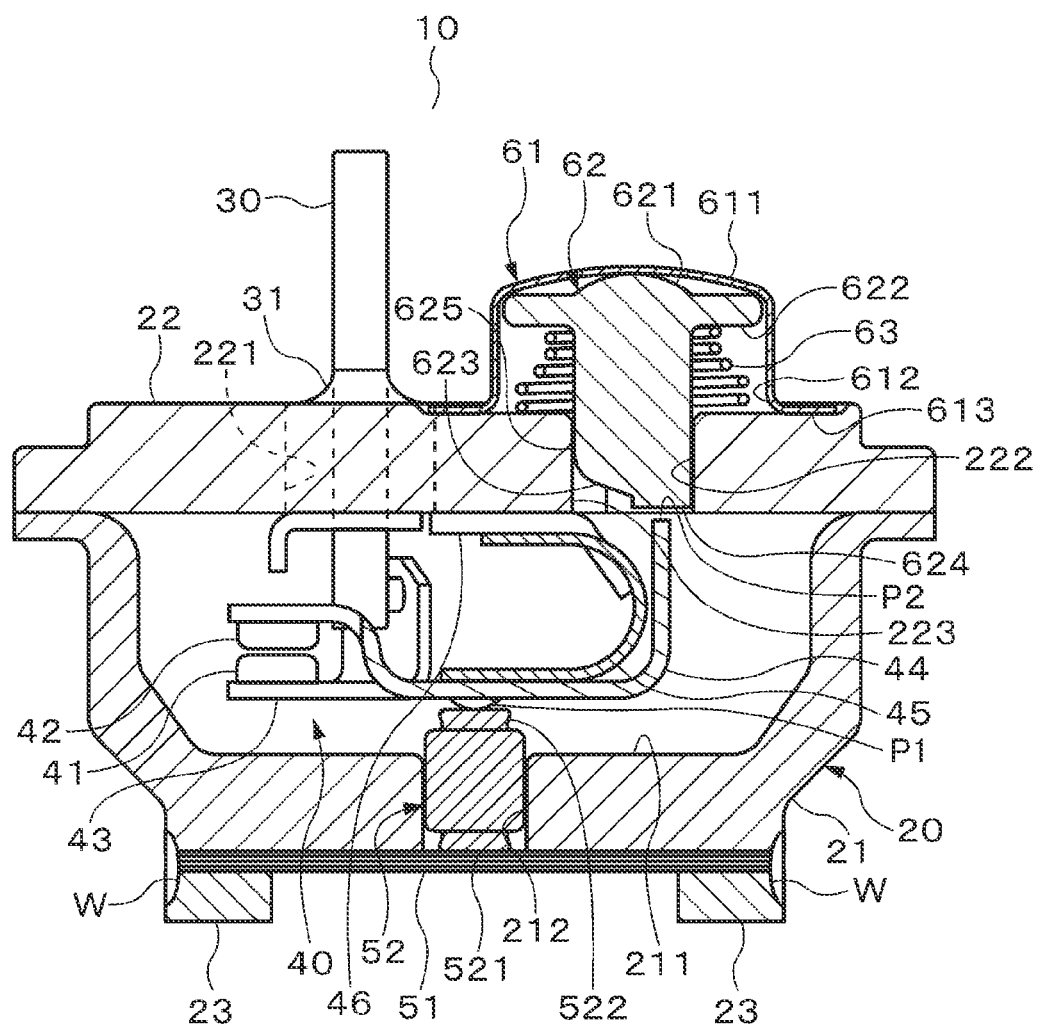
FIG. 6 is a sectional view equivalent to FIG. 2, which schematically illustrates the internal configuration of the example of the pressure switch according to the embodiment, and illustrates a case where a diaphragm is operated at pressure equal to or higher than first operating pressure and lower than second operating pressure.

The diaphragm 51 is configured to operate at the first operating pressure and be restorable at restoring pressure lower than the first operating pressure. That is, the diaphragm 51 is operated by deforming in the direction in which a curved shape is reversed, as illustrated in FIG. 6, when the pressure around the pressure switch 10 exceeds the first operating pressure. In addition, the diaphragm 51 is self-restored to its original shape as illustrated in FIG. 3 when the pressure around the pressure switch 10 drops to the restoring pressure or less. In this case, the restoring pressure can be set to the pressure lower than the first operating pressure and equal to or higher than the atmospheric pressure. Therefore, even after the pressure around the pressure switch 10 becomes greater than the first operating pressure and the diaphragm 51 is operated, the diaphragm 51 is restored when the pressure around the pressure switch 10 drops to at least the atmospheric pressure.

The first pressing member 52 is not made of resin but is composed of an inorganic material such as metal and ceramics. The first pressing member 52 has a cylindrical rod shape as a whole. The first pressing member 52 is provided through the one end surface part of the pressure-resistant container 20, in this case, the first end surface part 211. That is, a first through hole 212 is formed through the first end surface part 211. Then, the first pressing member 52 passes through the first through hole 212 and is configured to be movable, that is, slidable in the axial direction of the first pressing member 52. The length of the first pressing member 52 is set to be less than or equal to a distance between the diaphragm 51 and the first pressing point P1 under the atmospheric pressure as illustrated in FIG. 3. Therefore, below the first operating pressure, a proximal end 521 of the first pressing member 52 contacts the diaphragm 51 to such an extent that the movable member 44 is not operated, or does not contact the center of the diaphragm 51.

A distal end 522 of the first pressing member 52 faces the first pressing point P1 side of the movable member 44. In a state in which the diaphragm 51 is not operated, that is, below the first operating pressure, the distal end 522 of the first pressing member 52 is not in contact with the first pressing point P1 of the movable member 44, or is in contact to such an extent that the movable member 44 is not operated. In this case, below the first operating pressure, that is, in a case where the diaphragm 51 is not operated, the first pressing point P1 is located closer to the first end surface part 211 than the fixed contacts 41 and the movable contacts 42 in the direction of movement of the first pressing member 52.

The pressure-receiving deformation member 61, the second pressing member 62, and the regulating member 63 operate at the second operating pressure that is greater than the atmospheric pressure and greater than the first operating pressure, and has a function of pressing the second pressing point P2 due to this operation and opening the contact mechanism 40 so as to be irreversible, that is, so as not to be restorable.

The pressure-receiving deformation member 61 can be configured by drawing a metal plate into the shape of a container that is deeper than the diaphragm 51, for example. The pressure-receiving deformation member 61 is provided on an outer surface of the second end surface part 22, which is a different end surface part from the first end surface part 211 provided with the diaphragm 51 in the pressure-resistant container 20. The pressure-receiving deformation member 61 is airtightly fixed to the pressure-resistant container 20 by, for example, welding to the second end surface part 22.

Figure 7:
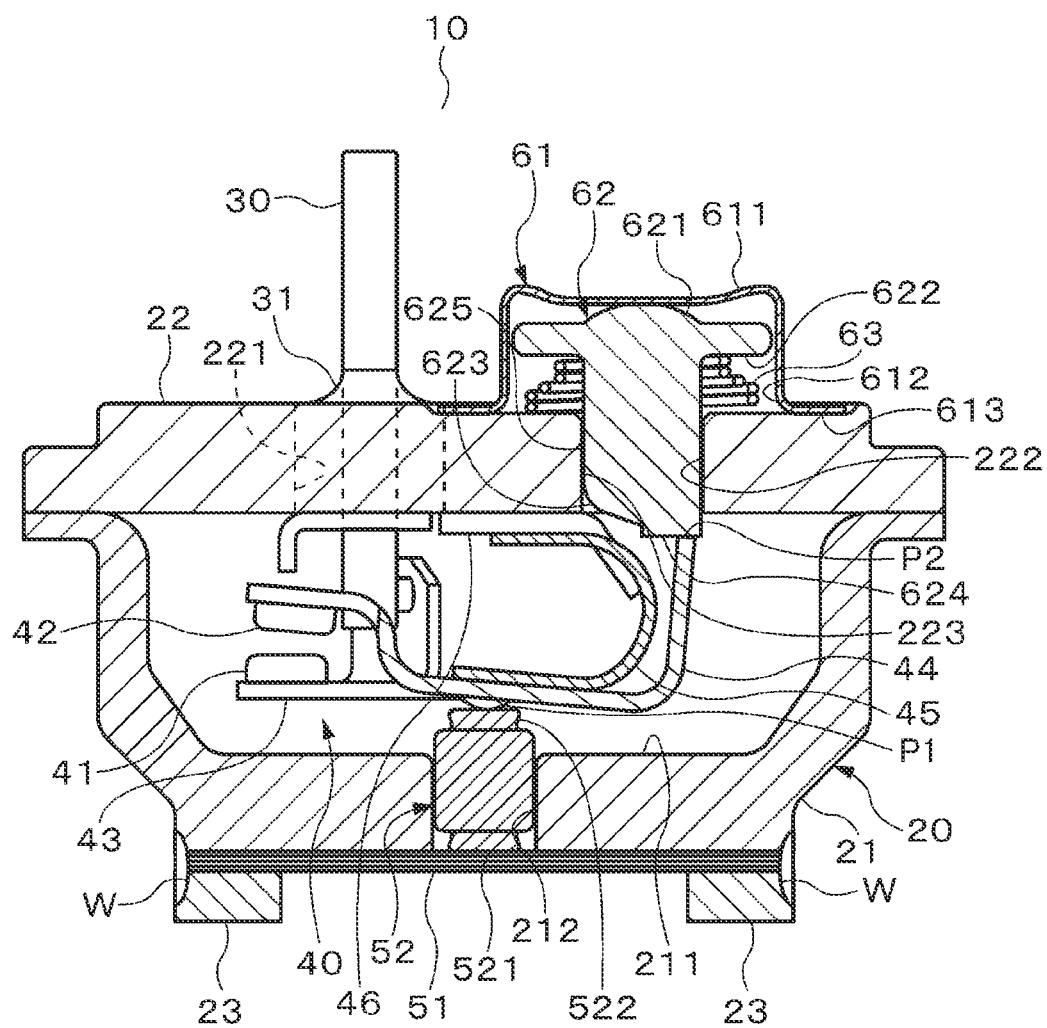
FIG. 7 is a sectional view equivalent to FIG. 2, which schematically illustrates the internal configuration of the example of the pressure switch according to the embodiment, and illustrates a case where the diaphragm and a pressure-receiving deformation member operate at pressure equal to or higher than the second operating pressure.

In this case, the pressure-receiving deformation member 61 can be configured to include, for example, a bottom part 611, an opening part 612, and a contact part 613. The bottom part 611 forms a bottom of the deep container-shaped pressure-receiving deformation member 61. In a case where the pressure around the pressure switch 10, that is, the pressure around the pressure-receiving deformation member 61 is less than the second operating pressure, the bottom part 611 has a curved shape bulged outward of the pressure-receiving deformation member 61, that is, shallow bowl-shape, as illustrated in FIG. 3 and FIG. 6. Then, when the pressure around the pressure-receiving deformation member 61 is equal to or higher than the second operating pressure, the bottom part 611 is deformed in such a direction as to be depressed toward the inside of the pressure-receiving deformation member 61, that is, toward the second end surface part 22, so as not to be restorable, as illustrated in FIG. 7.

The opening part 612 is located on the side opposite to the bottom part 611, that is, on the second end surface part 22 side, and forms a container-shaped opening. The contact part 613 is formed to expand from the opening part 612 toward the outside in the radial direction of the pressure-receiving deformation member 61 in a so-called flange shape. That is, the contact part 613 is formed into an annular plate shape, is provided around the opening part 612 of the container-shaped pressure-receiving deformation member 61, and faces an outer surface of the second end surface part 22. The contact part 613 is airtightly fixed to the outer surface of the second end surface part 22 by welding or the like.

The operating pressure of the pressure-receiving deformation member 61 is set to the pressure higher than the operating pressure of the diaphragm 51, that is, the second operating pressure higher than the first operating pressure. In addition, the pressure-receiving deformation member 61 is configured to be operated at the second operating pressure and be unable to be restored at the atmospheric pressure. That is, the pressure-receiving deformation member 61 is mainly deformed and operated in the direction in which the curved shape of the bottom part 611 reverses when the pressure around the pressure switch 10 exceeds the second operating pressure. Then, once the pressure-receiving deformation member 61 is deformed and operated, the pressure-receiving deformation member 61 is not restored even when the pressure around the pressure switch 10 drops to the pressure equal to or lower than the second operating pressure and the first operating pressure, that is, drops to the atmospheric pressure which is below the restoring pressure of the diaphragm 51.

The pressure switch 10 can be provided inside a compressor, for example. The first operating pressure is set to, for example, 3 MPa or more, which is the pressure during normal operation, and the pressure lower than the upper limit of the design pressure of the compressor. The first operating pressure can be set to, for example, around 4.0 MPa, which is equal to or higher than the condensation pressure of a refrigerant at 65° C., which is the abnormal pressure, and below the design pressure of the compressor. In this case, the restoring pressure of the diaphragm 51 can be set to the pressure that is higher than the atmospheric pressure and lower than the upper limit pressure in a normal operating range of the compressor, for example, around 3 MPa, which is the pressure during normal operation. The second operating pressure can be set to, for example, a value equal to or higher than an upper limit value of the design pressure of the compressor, that is, around 10 MPa, which is equal to or higher than the abnormal pressure at which the compressor may be damaged. The first operating pressure, the restoring pressure, and the second operating pressure are not limited to the above values, and can be changed as appropriate according to the purpose of use and an installation environment of the pressure switch 10.

The second pressing member 62 illustrated in FIG. 3 and other figures is not made of resin but is composed of an inorganic material such as metal and ceramics. The second pressing member 62 has a rod shape as a whole, and is housed inside of the cylindrical shape of the pressure-receiving deformation member 61. The second pressing member 62 passes through a second through hole 222 formed through the second end surface part 22, and is configured to be movable, that is, slidable in the axial direction of the second pressing member 62. The central axis of the first pressing member 52 is not aligned with the central axis of the second pressing member 62. The axial direction, that is, the direction of movement, of the first pressing member 52 and the axial direction, that is, the direction of movement of the second pressing member 62, are set in parallel.

The second pressing member 62 is located in a space different from a space in which the contact mechanism 40 is housed, in a state in which the pressure-receiving deformation member 61 is not operated. In the case of this embodiment, the contact mechanism 40 is housed inside the pressure-resistant container 20, that is, in a space surrounded by the container body 21 and the cover plate 22. On the other hand, in a case where the pressure-receiving deformation member 61 is not operated, the second pressing member 62 is housed in a space different from the inside of the pressure-resistant container 20. That is, in a case where the pressure-receiving deformation member 61 is not operated, a part of the second pressing member 62 is housed in a space surrounded by the cover plate 22 and the pressure-receiving deformation member 61 outside the pressure-resistant container 20, and a remaining part of the second pressing member 62 is housed in the second through hole 222 formed in the cover plate 22. In other words, in a case where the pressure-receiving deformation member 61 is not operated, the second pressing member 62 does not protrude into the pressure-resistant container 20.

The second pressing member 62 can be formed asymmetrically with respect to a line cut along the axial direction of the second pressing member 62, for example. As illustrated in FIG. 3, the second pressing member 62 can be configured to include, for example, a proximal end 621, a receiving part 622, a relief part 623, an action part 624, and a rotation stop part 625. The proximal end 621 is an end on the proximal end side of the second pressing member 62 of both ends of the pressure-receiving deformation member 61, that is, an end on the bottom part 611 side of the pressure-receiving deformation member 61. For example, the proximal end 621 can be formed into a curved shape that bulges toward the bottom part 611. In this case, the curvature radius of the curved shape of the proximal end 621 is smaller than the curvature radius of the curved shape of the bottom part 611.

The receiving part 622 is provided in the middle in the axial direction of the second pressing member 62, and is formed to spread outward in the radial direction of the second pressing member 62 into a so-called flange shape. The outer diameter of the receiving part 622 is larger than the outer diameter of other parts of the second pressing member 62 including the proximal end 621. The receiving part 622 is provided on the proximal end 621 side with respect to the center in the longitudinal direction of the second pressing member 62.

The relief part 623 is formed by cutting out a part of the distal end of the second pressing member 62 opposite to the proximal end 621 in an inclined shape. The relief part 623 has a function of preventing the distal end of the second pressing member 62 from contacting and interfering with the elastic member 45 in a case where the second pressing member 62 is pushed into the pressure-resistant container 20 due to the operation of the pressure-receiving deformation member 61. Consequently, regarding the moving amount of the second pressing member 62, it is possible to secure a large moving amount in a small space.

The action part 624 is provided on the distal end of the second pressing member 62, and has a function of contacting the second pressing point P2 of the movable member 44 and pressing the second pressing point P2 when the second pressing member 62 is pushed into the pressure-resistant container 20 due to the operation of the pressure-receiving deformation member 61.

Figure 4:
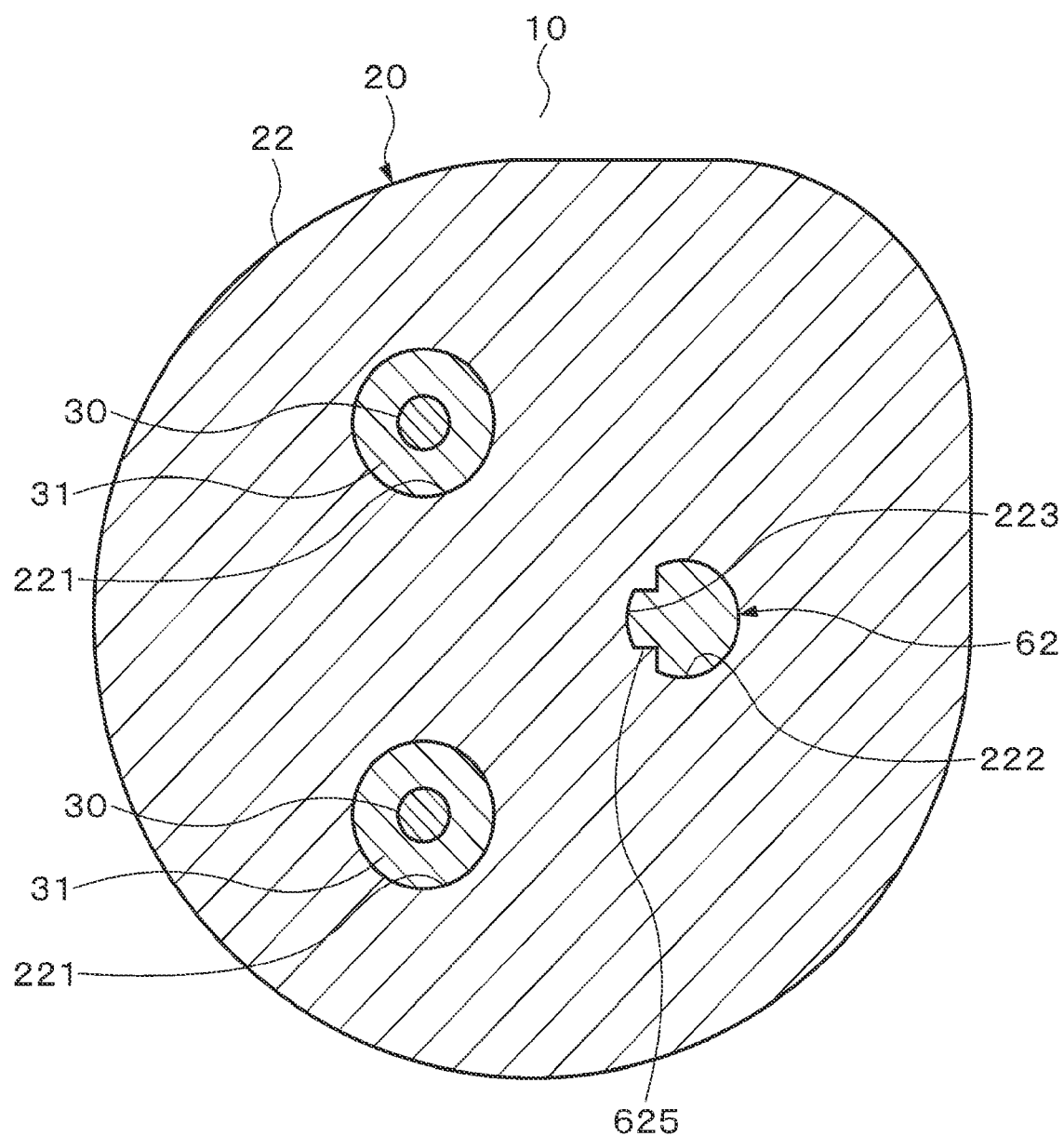
FIG. 4 is a sectional view taken along a line X4-X4 of FIG. 3, which schematically illustrates the internal configuration of the example of the pressure switch according to the embodiment.

In this case, when the second pressing member 62 rotates, a position of the action part 624 shifts relative to the second pressing point P2, so that reliable pressing is prevented. Therefore, the second pressing member 62 has the rotation stop part 625. The rotation stop part 625 can have a non-circular cross-sectional structure, for example, and can be provided between the receiving part 622 and the action part 624. In this case, as illustrated in FIG. 4, a groove part 223 having a shape corresponding to the rotation stop part 625 is formed in a part of the second through hole 222 formed in the second end surface part 22. When the second pressing member 62 is inserted into the second through hole 222, the rotation stop part 625 fits into the groove part 223, thereby regulating the rotation of the second pressing member 62. Thus, the rotation stop part 625 has a function of stopping the rotation of the second pressing member 62. Consequently, it is possible to prevent positional relationship between the second pressing point P2 and the action part 624 from shifting due to the rotation of the second pressing member 62. As a result, the action part 624 can reliably press the second pressing point P2.

The specific configuration of the rotation stop part 625 and the groove part 223 having a shape corresponding to the rotation stop part 625 is not limited to the configuration described above, as long as the rotation of the second pressing member 62 can be regulated. The rotation stop part 625 and the groove part 223 may have a cross-sectional shape such as a polygon, an ellipse, and a combination thereof.

As illustrated in FIG. 3 and other figures, the regulating member 63 is provided inside the pressure-receiving deformation member 61. The regulating member 63 has a function of regulating movement of the second pressing member 62 in such a direction as to press the contact mechanism 40 in a case where the pressure-receiving deformation member 61 is not operated. The regulating member 63 has a function of regulating the second pressing member 62 from moving inside the pressure-resistant container 20 and pressing the second pressing point P2 of the movable member 44 in a case where the surroundings of the pressure switch 10 are less than the second operating pressure and the pressure-receiving deformation member 61 is not deformed.

The regulating member 63 is composed of an elastic member made of an inorganic material such as metal. The regulating member 63 may be composed of a compression coil spring, for example, and can be provided between the second end surface part 22 and the receiving part 622. Consequently, the regulating member 63 can regulate the movement of the second pressing member 62 to the inside of the pressure-resistant container 20 by applying elastic force to the receiving part 622 in the direction away from the second end surface part 22. The regulating member 63 may be formed into a cylindrical shape by, for example, thin metal foil, and be configured to be crushed and deformed in a case where the pressure-receiving deformation member 61 is deformed and the second pressing member 62 is pressed against the bottom part 611.

The regulating member 63 can be composed, for example, of a metal compression coil spring with a plurality of outer diameters. That is, the regulating member 63 can be composed of, for example, a multistage or conical compression coil spring in which the diameter of one end is different from the diameter of the other end with respect to the direction of expansion and contraction of the regulating member 63. In FIG. 3 and other figures, for example, in the regulating member 63, the outer diameter on the receiving part 622 side can be made smaller than the outer diameter on the second end surface part 22 side. Therefore, when the second pressing member 62 moves into the pressure-resistant container 20, a part on the receiving part 622 side in the regulating member 63, which has the smaller outer diameter, enters a part of the regulating member 63 on the second end surface part 22 side, which has the larger outer diameter. The regulating member 63 illustrated in FIG. 3 and other figures can also be configured upside down. That is, the regulating member 63 may be configured such that the outer diameter on the receiving part 622 side is made larger than the outer diameter on the second end surface part 22 side.

In this configuration, when the pressure around the pressure switch 10 exceeds the atmospheric pressure and becomes the pressure in the range from the first operating pressure to the second operating pressure, as illustrated in FIG. 6, the diaphragm 51 is deformed and operated. Consequently, the first pressing member 52 is pressed by the diaphragm 51 to press the first pressing point P1. Then, the movable member 44 receives pressing force from the first pressing member 52 and moves toward the second end surface part 22 against the elastic force of the elastic member 45. Consequently, the movable contacts 42 are separated from the fixed contacts 41, so that the contact mechanism 40 is brought into an open state, that is, a cutoff state. A contact part between the movable member 44 and the elastic member 45 and a fulcrum part of swing of the movable member 44 do not necessarily have to coincide with each other.

In this case, when the pressure around pressure switch 10 drops to the restoring pressure or lower without exceeding the second operating pressure, the diaphragm 51 is self-restored to an initial state of the diaphragm 51, as illustrated in FIG. 3. Consequently, the first pressing member 52 moves toward the diaphragm 51 and is restored to an initial position due to the elastic force of the elastic member 45 transmitted mainly through the movable member 44. As a result, pressing to the first pressing point P1 is released. Then, the movable member 44 is restored to the initial state by the elastic force of the elastic member 45, and the movable contacts 42 come into contact with the fixed contacts 41 again. Consequently, the contact mechanism 40 becomes the closed state again even after the diaphragm 51 is operated.

On the other hand, when the pressure around the pressure switch 10 exceeds the second operating pressure, the pressure-receiving deformation member 61 is also operated in addition to the diaphragm 51, as illustrated in FIG. 7. Then, the second pressing member 62 is pressed by the pressure-receiving deformation member 61 to press the second pressing point P2. Consequently, the movable member 44 is pressed by the second pressing member 62 in addition to the first pressing member 52. Then, the movable member 44 swings with a contact part between the elastic member 45 and the second end surface part 22 as a fulcrum. Consequently, the movable contacts 42 is separated from the fixed contacts 41.

Figure 8:
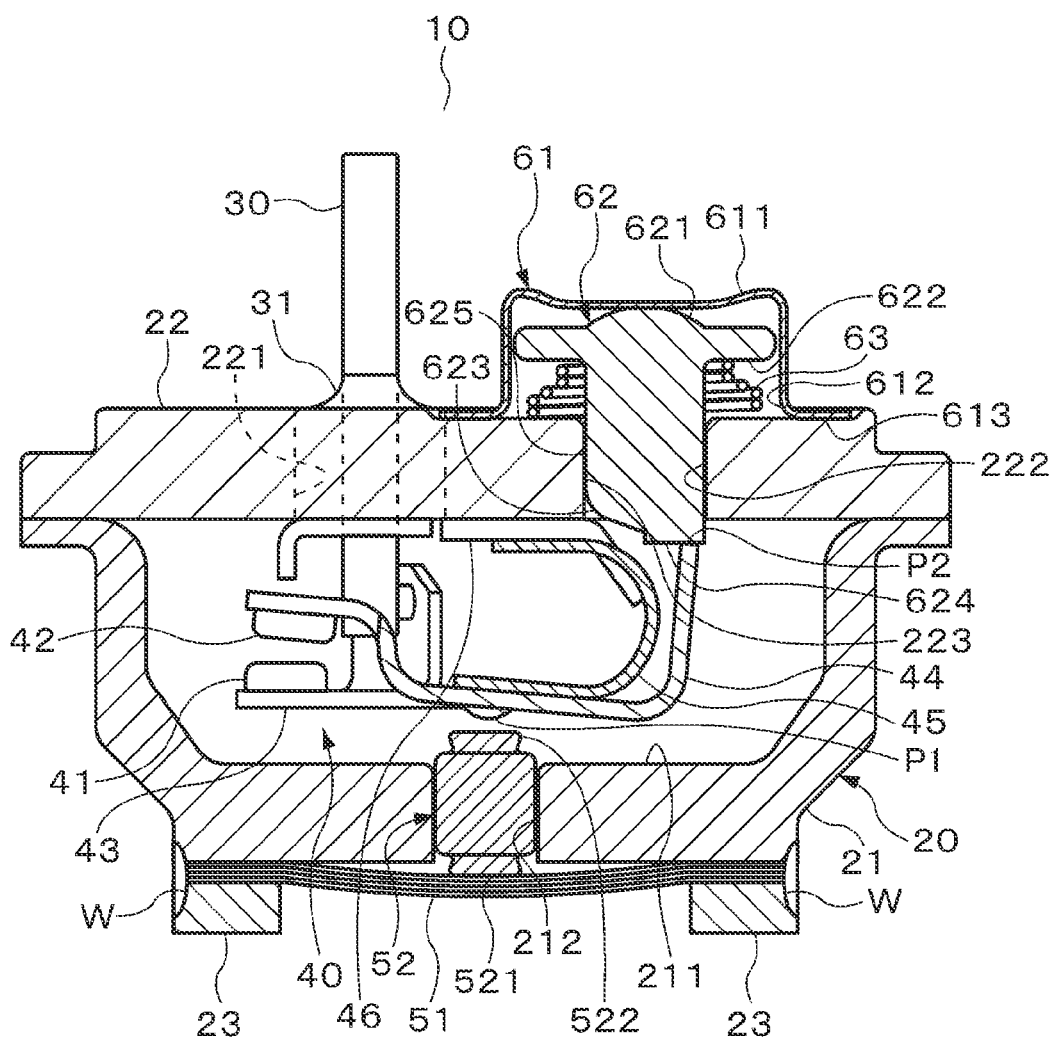
FIG. 8 is a sectional view equivalent to FIG. 2, which schematically illustrates the internal configuration of the example of the pressure switch according to the embodiment, and illustrates a case where the diaphragm and the pressure-receiving deformation member operate at the pressure equal to or higher than the second operating pressure and thereafter the pressure drops to the atmospheric pressure.

In this case, since the pressure-receiving deformation member 61 is operated once, even when the pressure around the pressure switch 10 drops to the restoring pressure or lower and the diaphragm 51 is restored, the pressure-receiving deformation member 61 is not restored as illustrated in FIG. 8. Therefore, since the pressing to the second pressing point P2 is maintained without being released, the movable contacts 42 do not come into contact with the fixed contacts 41 again. As a result, once the pressure around the pressure switch 10 exceeds the second operating pressure, the open state, that is, the cutoff state of the contact mechanism 40 is maintained.

Figure 9:
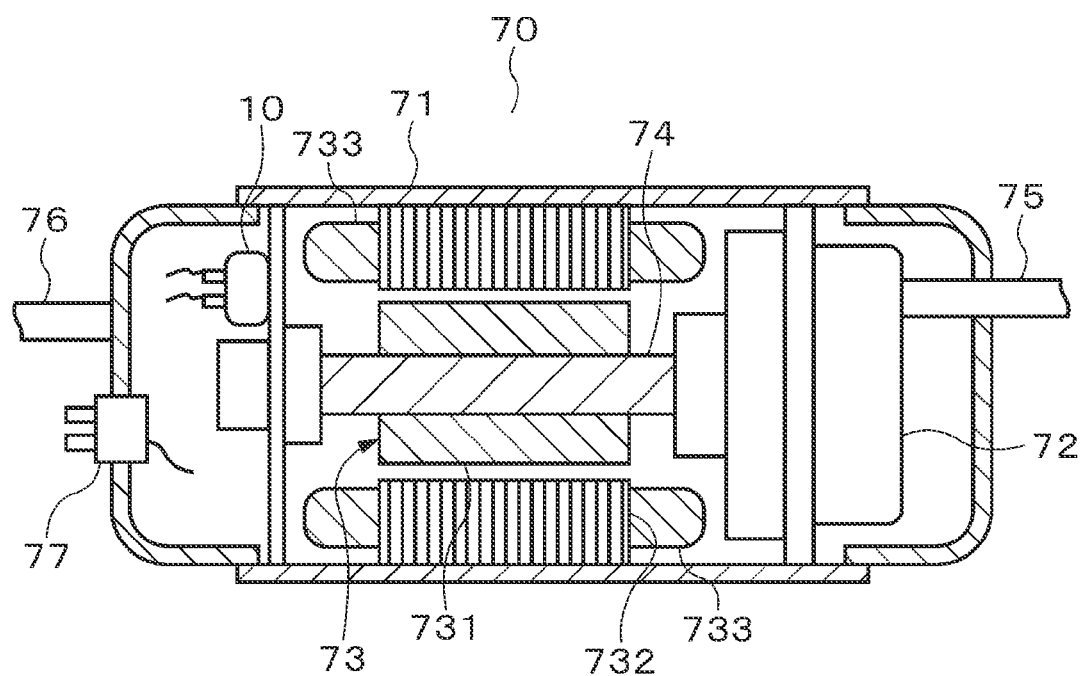
FIG. 9 is a sectional view illustrating an example of a hermetic electric compressor according to an embodiment.
Figure 10:
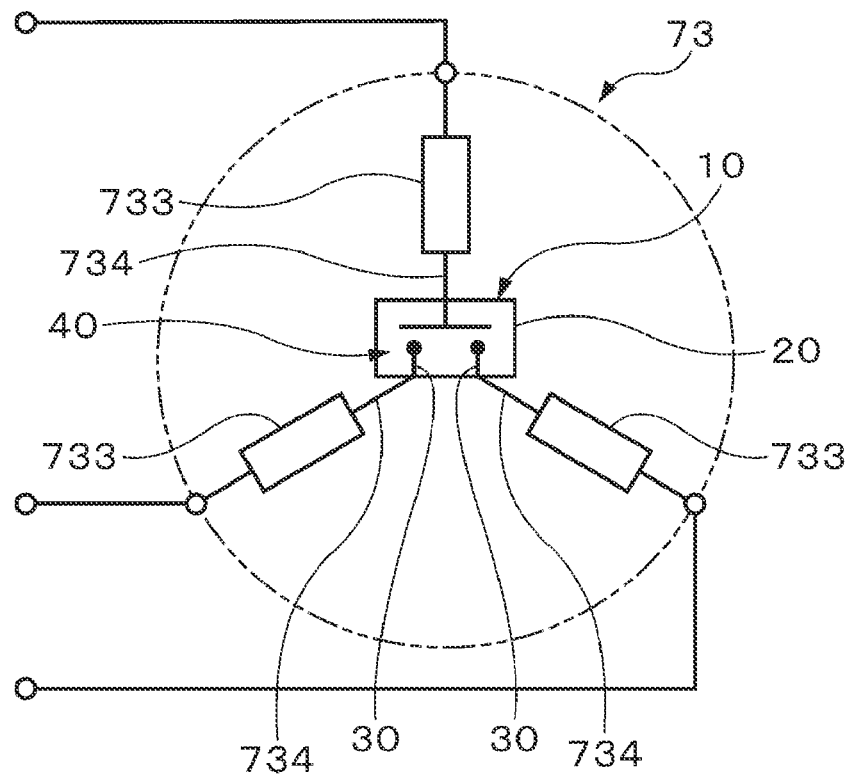
FIG. 10 is a conceptual diagram illustrating a connection form of a pressure switch to a three-phase motor of an example of the hermetic electric compressor according to the embodiment.

The pressure switch 10 having the above configuration can be applied as a pressure protection device for a hermetic electric compressor 70, for example, as illustrated in FIG. 9 and FIG. 10. In the following description, the hermetic electric compressor 70 is sometimes simply referred to as a compressor 70. The compressor 70 is a fully hermetic or semi-hermetic refrigerant electric compressor, and can be used, for example, in an air conditioner and form a part of a refrigerating cycle. The compressor 70 includes a compressor container 71, a compressor mechanism 72, and a motor 73. The compressor container 71 is a container that is pressure resistant and airtight, and forms an outer shell of the compressor 70.

Both the compressor mechanism 72 and the motor 73 are provided inside the compressor container 71. The motor 73 includes a rotor 731, a stator 732, and winding wires 733. The compressor mechanism 72 and the motor 73 are interconnected by a shaft 74. Consequently, rotational force of the motor 73 is transmitted to the compressor mechanism 72, and the compressor mechanism 72 is driven. A suction pipe 75 and a discharge pipe 76 are airtightly connected to the compressor container 71. The suction pipe 75 is a pipe for guiding a refrigerant from a heat exchanger (not illustrated) or the like to the compressor mechanism 72 in the compressor container 71. The discharge pipe 76 is a pipe for discharging a refrigerant compressed by the compressor mechanism 72 and sending the discharged refrigerant to the heat exchanger (not illustrated).

The compressor 70 includes an airtight terminal unit 77. The airtight terminal unit 77 is provided airtightly through the compressor container 71, and connects the motor 73 inside the compressor container 71 to an external power source. That is, power supply to the motor 73 is performed via the airtight terminal unit 77.

The pressure switch 10 is provided inside the compressor container 71 and is connected to power lines 734 of the motor 73. In the case of this embodiment, the motor 73 is a so-called Y-connected three-phase motor. The pressure switch 10 is connected to a neutral point of the Y connection of the three-phase motor 73, for example, as illustrated in FIG. 10. In this case, the two-phase power lines 734 of the three-phase power lines 734 of the motor 73 are electrically connected directly or indirectly to the respective two airtight terminals 30. Remaining one-phase power line 734 of the three-phase power lines 734 of the motor 73 is electrically connected directly or indirectly to an outer peripheral surface of the pressure-resistant container 20.

In this case, the direct connection means that each power line 734 is fixed and connected to the outer peripheral surface of the pressure-resistant container 20 or the airtight terminals 30 directly by welding or the like. In addition, the indirect connection means that, for example, connection terminals (not illustrated) are fixed to the outer peripheral surface of the pressure-resistant container 20 or the airtight terminals 30 by welding or the like, and each power line 734 is connected to the airtight terminal 30 or the outer peripheral surface of the pressure-resistant container 20 via this connection terminal.

In this configuration, when the pressure inside the compressor container 71 exceeds the first operating pressure, as described above, the diaphragm 51 is operated and the contact mechanism 40 is brought into the open state. As a result, the power supply to motor 73 is cut off and the compressor 70 stops. In this case, when the pressure within the compressor container 71 does not exceed the second operating the pressure, the pressure-receiving deformation member 61 is not operated. Therefore, when the pressure inside the compressor container 71 is released to the restoring pressure or lower, for example, the atmospheric pressure, the diaphragm 51 is restored. As a result, the contact mechanism 40 becomes the closed state again, and power supply to the motor 73 can be restarted.

On the other hand, when the pressure inside the compressor container 71 exceeds the second operating pressure, the pressure-receiving deformation member 61 is also operated. In this case, even when the pressure inside the compressor container 71 is released to the restoring pressure or lower, for example, the atmospheric pressure, and the diaphragm 51 is restored, the pressure-receiving deformation member 61 is not restored. As a result, the open state of the contact mechanism 40, that is, the power cutoff state is maintained.

According to the embodiment described above, the pressure switch 10 includes the pressure-resistant container 20 made of metal and having airtightness, the contact mechanism 40, at least the one airtight terminals 30, the diaphragm 51, the first pressing member 52, the pressure-receiving deformation member 61, and the second pressing member 62. The contact mechanism 40 is provided inside the pressure-resistant container 20 and is normally in the closed state and is brought into the open state when pressing force is applied. The airtight terminals 30 are provided through the pressure-resistant container 20 and connected to the contact mechanism 40. The diaphragm 51 is provided airtightly on the first end surface part 211 of the pressure-resistant container 20. The diaphragm 51 is operated at the first operating pressure and is restorable at the restoring pressure lower than the first operating pressure. The first pressing member 52 is provided through the first end surface part 211, and has a function of pressing the contact mechanism 40 due to the operation of the diaphragm 51 and switching the contact mechanism 40 to the open state.

The pressure-receiving deformation member 61 is composed of an inorganic material such as metal, and does not contain an organic material such as resin. The pressure-receiving deformation member 61 is made of metal and is airtightly provided on the second end surface part 22, which is different from the first end surface part 211 of the end surface parts of the pressure-resistant container 20. The pressure-receiving deformation member 61 is deformed and operated at the second operating pressure higher than the first operating pressure, and is not restored even when the pressure decreases to the atmospheric pressure after the operating at the second operating pressure. The second pressing member 62 is provided through the second end surface part 22. The second pressing member 62 has a function of pressing the contact mechanism 40 due to the operation of the pressure-receiving deformation member 61 and switching the contact mechanism 40 to the open state.

According to this configuration, the one pressure switch 10 enables two different types of operation, that is, restorable operation by the diaphragm 51 and non-restorable operation by the pressure-receiving deformation member 61. Consequently, both pressure abnormality caused by a temporary overload and pressure abnormality caused by exceeding the temporary overload can be handled with the one pressure switch 10 without providing two pressure switches. Therefore, the number of the pressure switches to be required can be reduced. As a result, the mounting space for pressure switch 10 can be reduced, so that it is possible to contribute to the downsizing of the compressor 70 and the like. Furthermore, the number of parts can be reduced, so that it is possible to reduce the number of manufacturing steps and costs for the compressor 70.

Herein, in the compressor 70 with the pressure switch 10 installed therein, in a case where a problem such as a layer short of the winding wires 733 and locking of the compressor mechanism 72 or the motor 73 occurs, the temperature and the pressure inside compressor 70 may rise excessively. Therefore, it is important that the pressure switch 10 does not change an operating characteristic or cause a malfunction even when the pressure switch is subjected to a high temperature or high pressure. In this embodiment, the first pressing member 52 and the second pressing member 62 can be each composed of a material that does not contain organic materials such as resin, or an inorganic material such as metal and ceramics.

According this, the first pressing member 52 and the second pressing member 62, which do not need to be electrically conductive, are composed of an inorganic material such as metal and ceramics instead of resin, so that even in a case where the temperature or the pressure inside the compressor 70 with the pressure switch 10 installed therein increases, there is no risk that gas or the like is generated from the first pressing member 52 and the second pressing member 62 due to resin decomposition. Consequently, it is possible to prevent gas or the like from being generated inside the pressure-resistant container 20 and contaminating the contact mechanism 40, especially the contacts 41 and 42. As a result, it is possible to suppress change in a contact resistance value of the contact mechanism 40, that is, change in the operating characteristic of the pressure switch 10.

Furthermore, when the diaphragm 51 and the pressure-receiving deformation member 61 operate at high pressure of several MPa, the first pressing member 52 and the second pressing member 62 receive a large load from the diaphragm 51 or the pressure-receiving deformation member 61. In this case, when the first pressing member 52 and the second pressing member 62 that are subjected to high temperatures and high loads are deformed or damaged, the contact mechanism 40 may become difficult to open and close normally, and cause malfunction of the pressure switch 10. On the other hand, in this embodiment, the first pressing member 52 and the second pressing member 62 are composed of inorganic materials such as metal and ceramics that are resistant to heat and have high load-bearing capacity. Consequently, for example, in a case where the first pressing member 52 or the second pressing member 62 is subjected to a large load in a state in which the pressure switch 10 is exposed to a high temperature environment, it is possible to effectively suppress deformation and damage to the first pressing member 52 or the second pressing member 62. As described above, according to this embodiment, it is possible to suppress change in the operating characteristic of the pressure switch 10 and the occurrence of malfunctions due to increases in temperature and pressure inside the compressor. As a result, it is possible to further improve the durability and secure long-term reliability.

The second pressing member 62 is located in the space different from the space in which the contact mechanism 40 is housed, in a state in which the pressure-receiving deformation member 61 is not operated. According to this, the second pressing member 62 is disposed in the space different from the space in which the contact mechanism 40 is housed, so that it is more reliably prevent the contact mechanism 40 from being contaminated due to the second pressing member 62.

The pressure-receiving deformation member 61 is formed into a bottomed cylindrical shape with the opening part 612 on the second end surface part 22 side and the bottom part 611 on the side opposite to the opening part 612. The opening part 612 side of the pressure-receiving deformation member 61 is airtightly provided on the second end surface part 22. The bottom part 611 has a curved shape bulged outward at less than the second operating pressure. Then, the bottom part 611 is deformed in such a direction as to be depressed toward the inside of the pressure-receiving deformation member 61, so as not to be restorable, at the second operating pressure or higher.

That is, the curved shape of the bottom part 611 of the pressure-receiving deformation member 61 reverses due to the operation. According to this, the bottom part 611 of the pressure-receiving deformation member 61 can greatly secure the moving amount, that is, the amount by which the second pressing member 62 is pushed, compared to the diaphragm 51. Consequently, in a case where the pressure-receiving deformation member 61 receives the pressure equal to or higher than the second operating pressure to be operated, the pressure-receiving deformation member 61 can reliably push the second pressing member 62 and can reliably separate the movable contacts 42 from the fixed contacts 41. As a result, it is possible to improve the reliability of the operation of the pressure switch 10.

The second pressing member 62 is housed inside the cylindrical shape of the pressure-receiving deformation member 61. The pressure switch 10 further includes the regulating member 63. The regulating member 63 has a function of regulating movement of the second pressing member 62 in such a direction as to press the movable member 44 of the contact mechanism 40, that is, the second pressing point P2 in a case where the pressure-receiving deformation member 61 is not operated, that is, is not deformed.

According to this, even when the pressure is less than the second operating pressure, the second pressing member 62 can be prevented from moving in such a direction as to push the second pressing point P2 of the contact mechanism 40 due to vibration applied to the pressure switch 10 or the like. That is, according to this, the pushing of the second pressing point P2 by second pressing member 62 is regulated until the pressure-receiving deformation member 61 is operated due to the pressure being at the second operating pressure or higher, and therefore it is possible to suppress the malfunction of the pressure switch 10 when the pressure is less than the second operating pressure. As a result, it is possible to further improve the reliability of the operation of the pressure switch 10.

The regulating member 63 is composed of a compression coil spring with one end and the other end, and the diameter of the one end is different from the diameter of the other end. As illustrated in FIG. 3 and other figures, for example, the regulating member 63 can make the outer diameter on the receiving part 622 side smaller than the outer diameter on the second end surface part 22 side. According to this, when the second pressing member 62 moves inside the pressure-resistant container 20, a part on the receiving part 622 side of the regulating member 63, which has a smaller outer diameter, enters a part on the second end surface part 22 side, which has a larger outer diameter. Consequently, the regulating member 63 can greatly secure the expansion and contraction amount of the regulating member 63 while suppressing the dimension in the expansion and contraction direction of the regulating member 63, that is, the dimension in the axial direction of the second pressing member 62. Therefore, it is possible to further greatly secure the moving amount of the second pressing member 62 while minimizing the dimension of the regulating member 63. As a result, it is possible to reliably press the second pressing point P2 of the movable member 44 to more reliably open the contact mechanism 40 in a case where the pressure becomes the second operating pressure or higher, while reducing the size of the regulating member 63 and the pressure-receiving deformation member 61. As a result, according to this embodiment, it is possible to further improve the reliability of the operation of the pressure switch 10, while reducing the size of the overall pressure switch 10.

The contact mechanism 40 includes at least the one fixed member 43, the movable member 44, and the elastic member 45. Each fixed member 43 includes the fixed contact 41 and are connected to the airtight terminal 30. The movable member 44 includes the movable contacts 42, and has a function of moving the movable contacts 42 in such a direction as to bring the movable contacts 42 into contact with the fixed contacts 41. The elastic member 45 includes one end connected directly or indirectly to the pressure-resistant container 20 and the other end connected to the movable member 44. The elastic member 45 has a function of applying elastic force to the movable member 44 in such a direction as to bring the movable contacts 42 into contact with the fixed contacts 41, and supporting the movable member 44 in a state in which the movable contacts 42 are movably separated from the fixed contacts 41.

The movable member 44 includes the first pressing point P1 pressed by the first pressing member 52 and the second pressing point P2 pressed by the second pressing member 62. Below the first operating pressure, that is, in a case where the diaphragm 51 is not operated, the first pressing point P1 is located closer to first end surface part 211 than the fixed contacts 41 and the movable contacts 42 in the moving direction of the first pressing member 52.

According to this, for example, compared to a configuration in which the movable member 44 has a simple L-shape in side view, that is, a configuration in which a distance from each fixed contact 41 to the first end surface part 211 is substantially equal to a distance from the first pressing point P1 to the first end surface part 211, the length dimension of the first pressing member 52 can be shortened. Therefore, it is possible to avoid an inconvenience that the first pressing member 52 inclines due to reaction force received from first pressing point P1, the first pressing member 52 is caught on an inner peripheral part of the first through hole 212, and movement of the first pressing member 52 becomes unstable, when the first pressing member 52 presses the first pressing point P1, for example. Thus, the pressure switch 10 of this embodiment can reliably open and close the contact mechanism 40 by the first pressing member 52. As a result, it is possible to further improve the reliability of the operation of the pressure switch 10.

The hermetic electric compressor 70 can be applied to, for example, a refrigerating cycle, and includes the compressor container 71 having airtightness, the compressor mechanism 72, the motor 73, and the pressure switch 10. The compressor mechanism 72 is provided inside the compressor container 71, and has a function of compressing and discharging a refrigerant. The motor 73 is provided inside the compressor container 71, and has a function of driving the compressor mechanism 72. The pressure switch 10 is provided inside the compressor container 71, and is connected to the power lines 734 of the motor 73. The motor 73 can be composed of a three-phase motor. The pressure switch 10 is connected to the neutral point of the motor 73.

In this case, the first operating pressure of the pressure switch 10 is set to a pressure value that is preferably restorable, for example, like pressure abnormality caused by a temporary overload of a refrigerating cycle. The second operating pressure is set to a pressure value that is preferably unrestorable, such as abnormal pressure which exceeds a range of the temporary overload of the refrigerating cycle and which causes deformation or damage to the compressor container 71 and a pipe or the like connected to the compressor container 71.

According to this, in a case where pressure abnormality which is preferably restorable occurs, the pressure switch 10 can cut off power supply to the motor 73 in a restorable state. In a case where pressure abnormality which is preferably unrestorable occurs, the pressure switch 10 can cut off power supply to the motor 73 in an unrestorable state. Consequently, in a case where the pressure abnormality occurs due to the temporary overload or the like, the pressure switch 10 can be restored and the motor 73 can be restarted, and therefore it is possible to save a trouble of repairing and replacing the pressure switch 10. In addition, in a case where the pressure abnormality occurs by exceeding the temporary overload, the pressure switch 10 can be caused not to be restorable and the motor 73 can be caused not to be able to restart, and therefore it is possible to prevent re-energization of the motor 73 and prevent a secondary accident that may occur if power is re-energized.

The present invention is not limited to the embodiments described above and illustrated in the drawings, and may be arbitrarily modified, combined, or expanded without departing from the gist thereof.

The numerical values indicated for each of the above embodiments are examples, and are not limited to these numerical values.

In addition, each of the above embodiments can be combined as appropriate.

For example, a pressure switch 10 may be configured to include one fixed contact 41, one movable contact 42, and one fixed member 43 corresponding to one or a plurality of airtight terminals 30. In this case, the one or plurality of airtight terminals 30 may be connected to the one fixed member 43 each. For example, a pressure switch 10 can be configured to include one airtight terminal 30, one fixed contact 41, one movable contact 42, one fixed member 43, and one movable member 44.

In addition, a coil spring or the like that assists operation of a diaphragm 51 may be provided around a first pressing member 52 between the first pressing member 52 and a first end surface part 211.

The pressure-resistant container 20 is not limited to a substantially cylindrical shape with a circular planar cross section, but may also have a rectangular cross section, for example. However, the pressure-resistant container 20 is formed into the substantially cylindrical shape with the circular cross section, so that the pressure-resistant container 20 has better compatibility with the diaphragm 51 and the pressure-receiving deformation member 61, and can be more compact compared to a case in which the cross section is rectangular.

In addition, the pressure switch 10 can also be applied to a thing other than the compressor 70.

The invention claimed is:

1. A pressure switch comprising:
a pressure-resistant container made of metal and having airtightness, the pressure-resistant container including a container body and a cover plate that airtightly closes an opening side of the container body;
a contact assembly that is made of metal, is provided inside the pressure-resistant container, is normally in a closed state, and is brought into an open state when a pressing force is applied;
at least one airtight terminal that is made of metal, is provided through the pressure-resistant container, and is connected to the contact assembly;
a diaphragm that is made of metal, is provided airtightly on a first end surface part as an end surface part of the pressure-resistant container, is operated at a first operating pressure, and is restorable at a restoring pressure lower than the first operating pressure;
a first push rod that is provided through the first end surface part, and presses the contact assembly due to the operation of the diaphragm and switches the contact assembly to the open state;
a cup-shaped metal shell that is made of metal, is airtightly provided on a second end surface part different from the first end surface part of end surface parts of the pressure-resistant container, is deformed and operated at a second operating pressure higher than the first operating pressure, and is not restored even when the pressure decreases to atmospheric pressure after the operation at the second operating pressure; and
a second push rod that is provided through the second end surface part, and presses the contact assembly due to the operation of the cup-shaped metal shell and switches the contact assembly to the open state, wherein
the first push rod and the second push rod are composed of an inorganic material without containing any organic material, and
in a state where the cup-shaped metal shell is not operated, a part of the second push rod is housed in a space surrounded by the cover plate and the cup-shaped metal shell, and a remaining part of the second push rod is housed in a through hole formed in the cover plate.

2. The pressure switch according to claim 1, wherein:
the cup-shaped metal shell is formed into a bottomed cylindrical shape with an opening part on a side of the second end surface part and a bottom part on a side opposite to the opening part, and a side of the opening part is airtightly provided on the second end surface part, and
the bottom part has a curved shape bulged outward at less than the second operating pressure, and the bottom part is deformed in such a direction as to be depressed toward inside of the cup-shaped metal shell, so as not to be restorable, at the second operating pressure or higher.

3. The pressure switch according to claim 2, wherein:
the second push rod is housed inside the cylindrical shape of the cup-shaped metal shell, and
the pressure switch further comprises a a compression coil spring that regulates movement of the second push rod in such a direction as to press the contact assembly in a case where the cup-shaped metal shell is not operated.

4. The pressure switch according to claim 3, wherein:
the compression coil spring is composed of a compression coil spring with one end and the other end, and a diameter of the one end is different from a diameter of the other end.

5. The pressure switch according to claim 1, wherein the contact assembly includes:
at least one fixed contact arm that includes a fixed contact, and is connected to the airtight terminal;
a movable contact lever that includes a movable contact, and moves the movable contact in such a direction as to bring the movable contact into contact with the fixed contact and in such a direction as to separate the movable contact from the fixed contact; and
a plate spring that includes one end connected to the pressure-resistant container, and the other end connected to the movable contact lever, applies elastic force to the movable contact lever in such a direction as to bring the fixed contact into contact with the movable contact, and supports the movable contact lever in a state in which the movable contact is movable in such a direction as to be separated from the fixed contact,
the movable contact lever includes a first pressing point pressed by the first push rod and a second pressing point pressed by the second push rod, and
the first pressing point is located closer to the first end surface part than the fixed contact and the movable contact at less than the first operating pressure.

6. A hermetic electric compressor comprising:
a compressor container having airtightness;
a compressor assembly that is provided inside the compressor container, and compresses and discharges a refrigerant;
a motor that is provided inside the compressor container, and drives the compressor assembly; and
the pressure switch according to claim 1, the pressure switch being provided inside the compressor container and connected to a power line of the motor.

7. The hermetic electric compressor according to claim 6, wherein
the motor is a three-phase motor, and
the pressure switch is connected to a neutral point of the motor.

\* \* \* \* \*